US008751720B2

(12) United States Patent
Kim

(10) Patent No.: US 8,751,720 B2
(45) Date of Patent: Jun. 10, 2014

(54) COMPUTATIONALLY-NETWORKED UNIFIED DATA BUS

(76) Inventor: Moon J. Kim, Wappingers Falls, NY (US)

( * ) Notice: Subject to any disclaimer, the term of this patent is extended or adjusted under 35 U.S.C. 154(b) by 278 days.

(21) Appl. No.: 12/941,236

(22) Filed: Nov. 8, 2010

(65) Prior Publication Data

US 2012/0117291 A1    May 10, 2012

(51) Int. Cl.
*G06F 13/36* (2006.01)
*H04L 12/28* (2006.01)

(52) U.S. Cl.
USPC ............................ 710/306; 370/412; 370/419

(58) Field of Classification Search
USPC ................................. 710/306; 370/412, 419
See application file for complete search history.

(56) References Cited

U.S. PATENT DOCUMENTS

| | | | |
|---|---|---|---|
| 6,757,761 B1* | 6/2004 | Smith et al. ................... | 710/100 |
| 6,845,446 B1* | 1/2005 | Fuller ........................... | 713/153 |
| 7,047,340 B1 | 5/2006 | Baumgartner et al. | |
| 7,209,996 B2 | 4/2007 | Kohn et al. | |
| 7,596,650 B1* | 9/2009 | Aditya et al. ................. | 710/301 |
| 7,624,250 B2 | 11/2009 | Lau et al. | |
| 7,644,221 B1* | 1/2010 | Chan et al. .................... | 710/315 |
| 7,673,140 B2* | 3/2010 | Evoy .............................. | 713/168 |
| 7,676,669 B2 | 3/2010 | Ohwada | |
| 7,873,785 B2* | 1/2011 | Olukotun ...................... | 711/118 |
| 8,180,923 B2* | 5/2012 | Smith et al. ................... | 709/250 |
| 8,407,715 B2* | 3/2013 | Lee et al. ....................... | 718/108 |
| 2004/0225821 A1* | 11/2004 | Klein et al. .................... | 710/306 |
| 2006/0136605 A1 | 6/2006 | Olukotun | |
| 2006/0236016 A1* | 10/2006 | Tetrick .......................... | 710/306 |
| 2009/0216974 A1* | 8/2009 | Morishima et al. ........... | 711/162 |
| 2010/0088453 A1 | 4/2010 | Solki et al. | |
| 2010/0262733 A1 | 10/2010 | Gaskins et al. | |
| 2010/0325392 A1* | 12/2010 | Kim ................................ | 712/33 |
| 2011/0067029 A1* | 3/2011 | Wolfe et al. .................... | 718/102 |
| 2012/0011389 A1* | 1/2012 | Driesen et al. ................ | 713/600 |
| 2012/0066509 A1* | 3/2012 | Lapp et al. ..................... | 713/189 |

OTHER PUBLICATIONS

Jernej Barbic, Multi-core architectures, May 3, 2007.*
Akram, S. et al., "A Workload-Adaptive and Reconfigurable Bus Architecture for Multicore Processors", International Journal of Reconfigurable Computing, vol. 2010 (2010), Article ID 205852, 22 pages.

* cited by examiner

*Primary Examiner* — Paul R Myers
*Assistant Examiner* — Chrsitopher A Daley

(57) ABSTRACT

Embodiments of the present invention provide a computationally-networked unified data bus for a multi-processing domain architecture. Specifically, in a typical embodiment, a unified data bus is provided. A first data bus adapter (e.g., a node) is coupled to the unified data bus (e.g., a link), and a first processing domain is coupled to the first data bus adapter. In general, the first data bus adapter encapsulates, translates, and interprets data communicated between the unified data bus and the first processing domain. In addition, a second data bus adapter (e.g., a node) is coupled to the unified data bus and a second processing domain is coupled to the second data bus adapter. Similar to the first data bus adapter, the second data bus adapter encapsulates, translates, and interprets data communicated between the unified data bus and the second processing domain. Under these embodiments, the first processing domain and the second processing domain can each comprise at least one element selected from a group consisting of: memory input/outputs (I/Os), cache, heterogeneous data buses, and processors. Moreover, the first processing domain and the second processing domain can be selected from a group consisting of a heterogeneous processing domain and a hybrid processing domain.

16 Claims, 4 Drawing Sheets

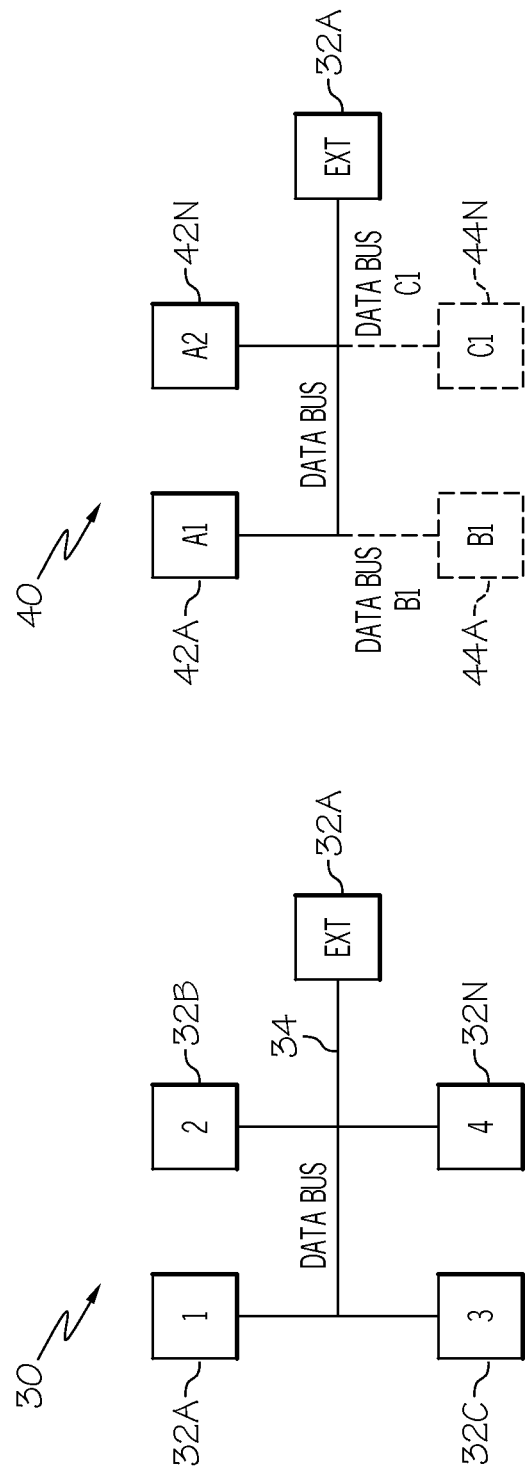

TWO CORES HAVING ATTACHED NODES
ARE SHOWN. NODES ARE CONNECTED
WITH A LINK

HYBRID CORES HAVE ATTACHED NODES. NODES ADAPT TO ATTACHED CORES RESULTING
IN A UNIFIED DATA BUS UNIFIED. NODE I/OS ARE TRANSPORTED THROUGH A LINK. EXTERNAL
I/O ALSO HAS AN ATTACHED NODE.

COMPUTATIONALLY-NETWORKED UNIFIED DATA BUS

CROSS-REFERENCE TO RELATED APPLICATION

This application is related in some aspects to commonly-owned and co-pending application Ser. No. 12/496,776, entitled "HYBRID MULTI-FUNCTION COMPONENT SYSTEM", filed on Jul. 2, 2009, the entire contents of which are herein incorporated by reference.

TECHNICAL FIELD

The present invention generally relates to multi-core integration. Specifically, the present invention relates to a computationally-networked unified data bus for multi-core integration.

BACKGROUND OF THE INVENTION

Multi-Core Processor (MCP) technology has traditionally been applied to a system to perform a specific function in an application. The characteristics of each core's technology are different, and, therefore, such an approach does not work well when two or more cores are mixed. The design inflexibility forces continuous use of one technology. For an example, in a symmetric MCP, there can be a Main Processing Element (MPE) and Synergetic Processor Elements (SPE). In addition, each hybrid design requires customized integration of different component technologies. This is time-consuming, and is subject to design error and mistakes. Moreover, ever-increasing interconnect complexity prevents design scalability. Still yet, different technology components present compatibility and efficiency problems. Previous core collaboration is limited to conventional direct-computation mode without much flexibility. Such an approach reduces overall performance gain available from the integration. Moreover, conventional data bus requires custom design per system. This requirement is time consuming, prone to error, and inefficient.

U.S. Pat. No. 7,624,250 discloses a multi-core processor. The cores have different functional operability and include a chain of multiple unidirectional connections spanning processor cores, terminating in registers within the respective processor cores.

U.S. Pat. No. 7,209,996 discloses a multi-core and multi-threaded processor that includes four threaded cores and/or a crossbar that incorporates the cache memory.

U.S. Patent Application 20060136605 discloses multi-core multi-thread processor crossbar architecture. The crossbar includes an arbiter functionality to sort multiple requests.

U.S. Pat. No. 7,676,669 discloses a processor control method. Yield improvements are claimed to be attained with the aid of partial core quality product chips that are activated by a core selection flag register that maintains the status us each core and controls the output to the core block from the processor common block.

U.S. Pat. No. 7,047,340 discloses a data bus method for the communication between two assemblies.

U.S. Patent Application 20100088453 discloses an architecture and method. Embodiments provide alternatives to the use of external bridge IC architecture by using a multiplex of peripheral bus so that multiple processors can use one peripheral interface slot without requiring an external bridge.

SUMMARY OF THE INVENTION

In general, embodiments of the present invention provide a computationally-networked unified data bus for a multi-processing domain architecture. Specifically, in a typical embodiment, a unified data bus is provided. A first data bus adapter (e.g., a node) is coupled to the unified data bus (e.g., a link), and a first processing domain is coupled to the first data bus adapter. In general, the first data bus adapter encapsulates, translates, and interprets data communicated between the unified data bus and the first processing domain. In addition, a second data bus adapter (e.g., a node) is coupled to the unified data bus and a second processing domain coupled to the second data bus adapter. Similar to the first data bus adapter, the second data bus adapter encapsulates, translates, and interprets data communicated between the unified data bus and the second processing domain. Under these embodiments, the first processing domain and the second processing domain can each comprise at least one element selected from a group consisting of: memory input/outputs (I/Os), cache, heterogeneous data buses, and processors. Moreover, the first processing domain and the second processing domain can be selected from a group consisting of a heterogeneous processing domain and a hybrid processing domain.

A first aspect of the present invention provides a computationally-networked unified data bus for a multi-core architecture, comprising: a unified data bus; a first data bus adapter coupled to the unified data bus; a first core coupled to the first data bus adapter, the first data bus adapter encapsulating, translating, and interpreting data communicated between the unified data bus and the first core; a second data bus adapter coupled to the unified data bus; and a second core coupled to the second data bus adapter, the second data bus adapter encapsulating, translating, and interpreting data communicated between the unified data bus and the second core.

A second aspect of the present invention provides a computationally-networked unified data bus for a multi-processing domain architecture, comprising: a unified data bus; a first data bus adapter coupled to the unified data bus; a first processing domain coupled to the first data bus adapter, the first data bus adapter encapsulating, translating, and interpreting data communicated between the unified data bus and the first processing domain; a second data bus adapter coupled to the unified data bus; and a second processing domain coupled to the second data bus adapter, the second data bus adapter encapsulating, translating, and interpreting data communicated between the unified data bus and the second processing domain.

A third aspect of the present invention provides a method for producing a computationally-networked unified data bus for a multi-processing domain architecture, comprising: providing a unified data bus; coupling a first data bus adapter coupled to the unified data bus; coupling a first processing domain coupled to the first data bus adapter, the first data bus adapter encapsulating, translating, and interpreting data communicated between the unified data bus and the first processing domain; coupling a second data bus adapter coupled to the unified data bus; and coupling a second processing domain coupled to the second data bus adapter, the second data bus adapter encapsulating, translating, and interpreting data communicated between the unified data bus and the second processing domain.

BRIEF DESCRIPTION OF THE DRAWINGS

These and other features of this invention will be more readily understood from the following detailed description of the various aspects of the invention taken in conjunction with the accompanying drawings in which:

FIG. 2A depicts a data bus conventional multi-core architecture according to the related art.

FIG. 2B depicts a data bus hybrid multi-core architecture according to an embodiment of the present invention.

Figure 1:
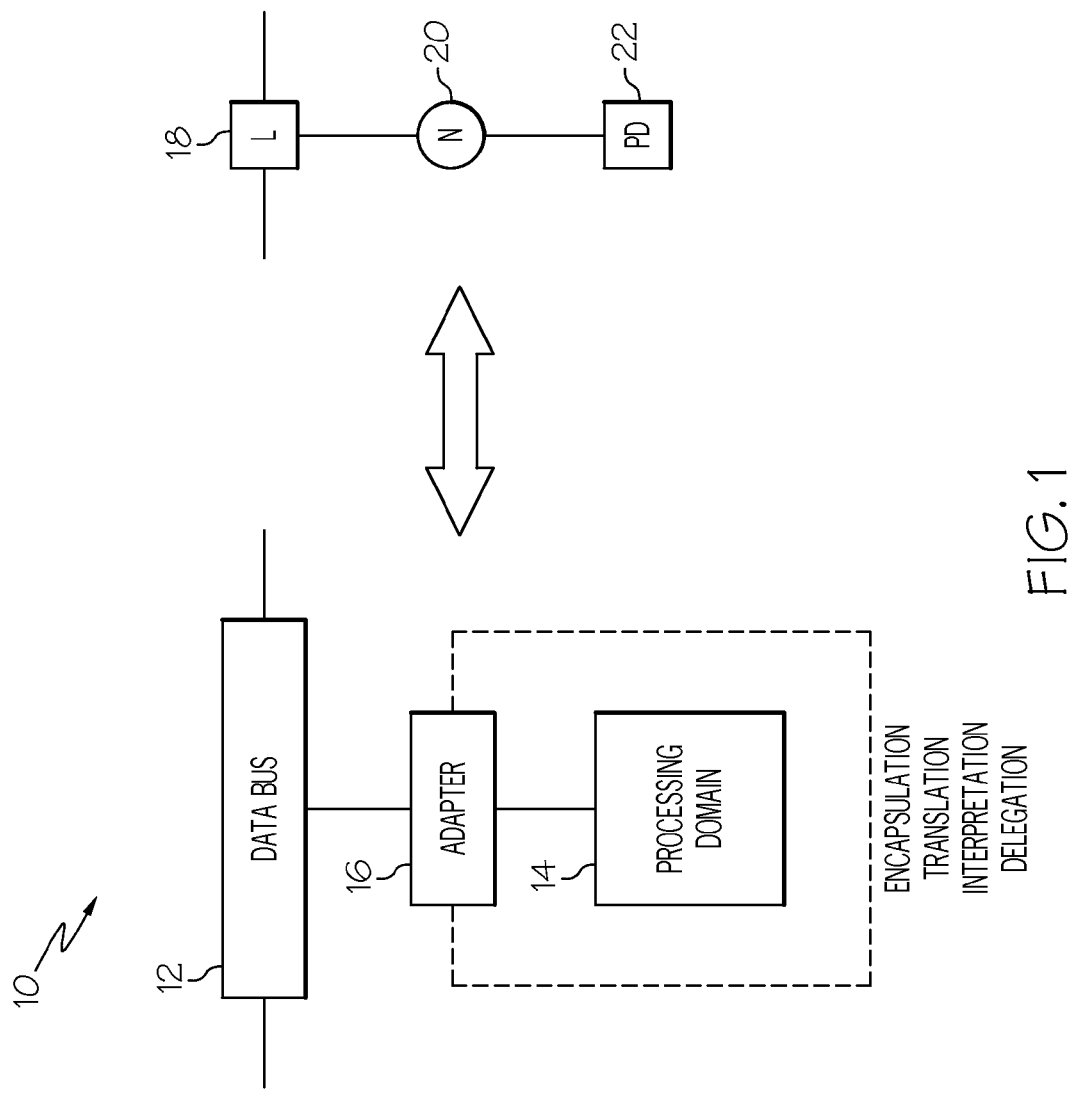
FIG. 1 depicts a computationally-networked unified data bus architecture according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention.

DETAILED DESCRIPTION OF THE INVENTION

Exemplary embodiments now will be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

In general, embodiments of the present invention provide a computationally-network unified data bus for a multi-processing domain architecture. Specifically, in a typical embodiment, a unified data bus is provided. A first data bus adapter (e.g., a node) is coupled to the unified data bus (e.g., a link), and a first processing domain is coupled to the first data bus adapter. In general, the first data bus adapter encapsulates, translates, and interprets data communicated between the unified data bus and the first processing domain. In addition, a second data bus adapter (e.g., a node) is coupled to the unified data bus and a second processing domain coupled to the second data bus adapter. Similar to the first data bus adapter, the second data bus adapter encapsulates, translates, and interprets data communicated between the unified data bus and the second processing domain. Under these embodiments, the first processing domain and the second processing domain can each comprise at least one element selected from a group consisting of: memory input/outputs (I/Os), cache, heterogeneous data buses, and processors. Moreover, the first processing domain and the second processing domain can be selected from a group consisting of a heterogeneous processing domain and a hybrid processing domain.

Referring now to FIG. 1 FIG. 1 depicts a computationally-networked unified data bus architecture 10 according to an embodiment of the present invention. As depicted, architecture 10 comprises a computationally-networked unified data bus 12 coupled to a data bus adapter 16, which itself is coupled to a processing domain 14. In general, processing domain 14 can comprise a core (e.g., memory input/outputs (I/Os), cache, heterogeneous data buses, and/or processors, etc.). In a more general form, data bus 12, data bus adapter 16, and processing domain represent a link 18, a node 20 and a processing domain 22, respectively. Regardless, data bus adapter 16 typically works in conjunction with processing domain 14 to encapsulate, translate, and interpret data, and/or delegate functionality.

Referring to FIG. 2A, the related art and its drawbacks will be discussed in greater detail In FIG. 2A, a data bus architecture 30 is depicted. Architecture show cores 32A-N connected to a common data bus 34. Such a configuration is not optimal because, among other reasons, this fails to account for individual intricacies specific to each core. FIG. 2B shows a hybrid multi-core system 40. As depicted, cores 42A-N are shown, with each core having customer data buses 44A-N. This allows for each intricacy of each core to be accommodated with its own customized data bus.

Figure 3A:
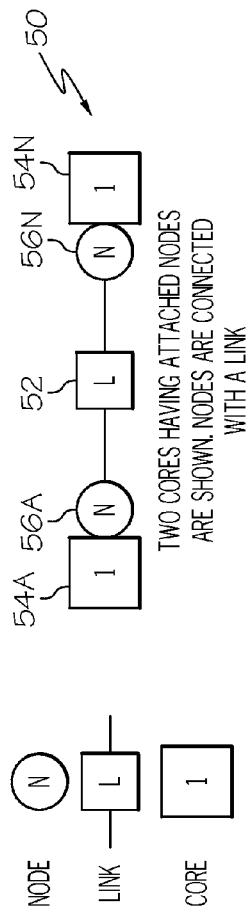
FIGS. 3A-B depict a computationally-networked unified data bus architecture according to an embodiment of the present invention.
Figure 3B:
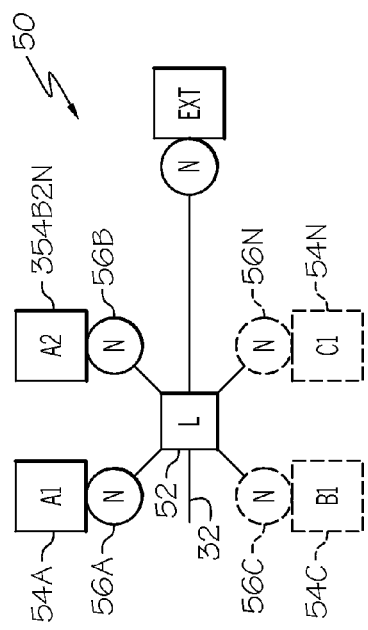

Referring now to FIG. 3A, a computationally-networked unified data bus for a multi-core architecture 50 is shown in greater detail. As depicted, architecture 50 includes processing domains 54A-N such as cores 54A-N (e.g., memory input/outputs (I/Os), cache, heterogeneous data buses, and/or processors, etc.) coupled to link 52 (e.g., computationally-networked unified data bus) via nodes 56A-N (e.g., data bus adapters). As further shown in FIG. 3B, processing domains 54C-N can also be custom data buses themselves (similar to those shown in FIG. 2B). Regardless, as shown in FIG. 3B, each processing domain 54A-N has an attached node. This can even apply to any external nodes.

In general, architecture 50 provides system integration of hybrid and heterogeneous cores using unified data bus architecture. As indicated, link 52 can comprise a computationally-networked unified data bus in a multi-core system. Along these lines, the unified data bus: is considered as a computational entity; accommodates out-of-entity virtualization; integrates heterogeneous hybrid entities with transparent translation; reconfigures network architecture in real-time; reconfigures bus configuration in real-time; delegates instruction set architecture mapping and interpretation; and facilitates data encapsulation, virtualization, and system optimization. Moreover, unified data bus 52 provides: faster integration time; address, data, and instruction translation; core and bus control, status, and command; data bus-wide computation for operation; instruction interception and data bus computation; real-time data bus operation optimization; highly flexible data bus operation; and/or multi-level virtualization including out-of-entity virtualization. Still yet, nodes 56A-N and link 52 have computational capability with input and output. In general, nodes 56A-N: are attached to cores 54A-N; maintain information on the attached cores; and/or keep the input and output data to and from the core. Link 52 has multiple I/O connections to link or nodes, and can have various formats and speeds.

In a typical embodiment, node functions include the following: data encapsulation (e.g., address, data, and instruction); virtualization (e.g., by translating address, data, and instruction); interpretation (e.g., instruction mapping and translation); function delegation to others (e.g., node, link, core, and/or external); performing delegated functions (e.g., from node, link, core, and/or external); and/or unified data bused multi-core node and link computation (e.g., node and link for a computational network to perform collaborative functions). Link functions can include the following: connection configuration (e.g., assign bit-width and speed to each connection); real-time bus optimization (e.g., analyze demands and adjust assigned connection format for optimization purpose); and/or routing (e.g., communication load balancing and routing between links and nodes).

As indicated above, in a typical embodiment: link 52 comprises a computationally-networked unified data bus, processing domains 54A-N can comprise cores or at least one element selected from a group consisting of: memory input/outputs (I/Os), cache, heterogeneous data buses, and processors. Along these lines, processing domains/cores 54A-N can be heterogeneous, hybrid, or any combination thereof.

Figure 4:
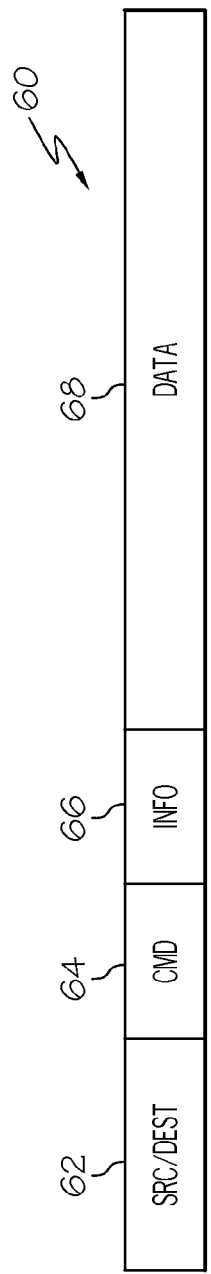
FIG. 4 depicts a data structure according to an embodiment of the present invention.

Referring now to FIG. 4, a data structure 60 according to an embodiment of the present invention is shown. As shown, data structure comprises source/destination information 62, command data 64, information 66 (e.g., header), and underlying data 68 fields. In a typical embodiment, data output from an entity includes: memory addressing information and contents; data is packaged with a pre-defined format; source, destination, and command/type, information fields that are appended; fields enable additional features to the computationally-networked unified data bus (e.g., out-of-immediate-memory virtualization; instruction translation; delegated instruction interpretation; faster cache virtualization; and/or dynamic bus management).

Figure 5:
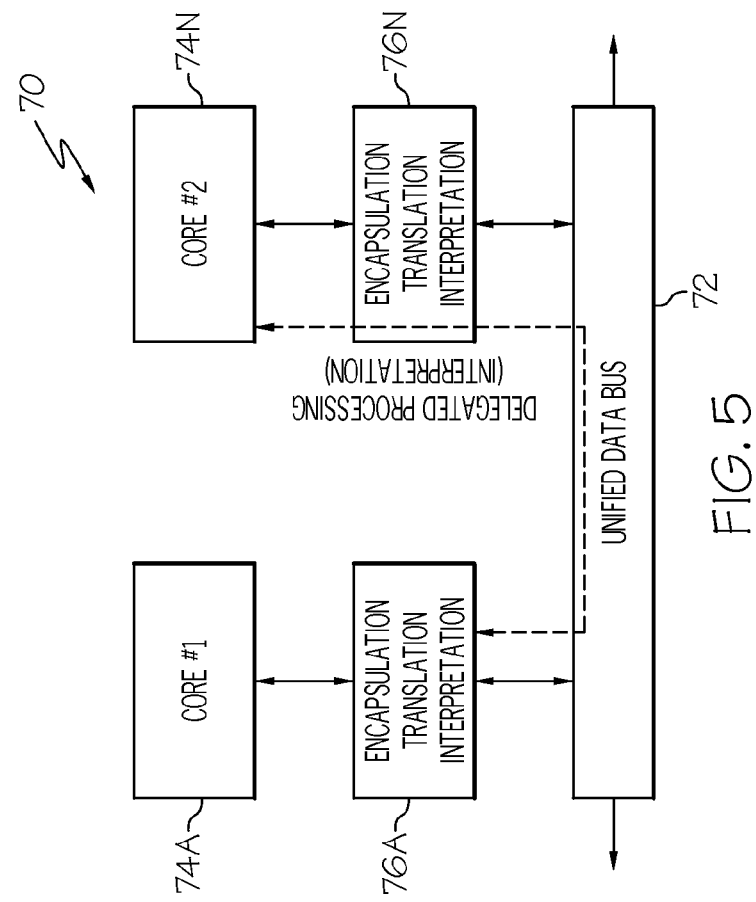
FIG. 5 depicts a component flow diagram according to an embodiment of the present invention.

Referring now to FIG. 5, a component flow diagram 70 according to the present invention is shown. As depicted, cores 74A-N are coupled to computationally-networked unified data bus 72 via individual unified data/bus adapters 76A-N. In this example, processing domains are cores 74A-N, while nodes are data bus adapters 76A-N. However, this need not be the case as indicated above. Regardless, data bus adapters 76A-N perform data processing, including encapsulation, translation, and interpretation. Under at least one embodiment of the present invention, additional processing such as interpretation can be delegated to other cores (or the core itself in different threads).

In general, the following features are enabled by the embodiments of the present invention: virtualization for an out-of-physical entity (hetero core or external system); bus/cache/core status report/control headers; address headers for delivery; bus speed and bit-width control; bus traffic reporting and optimization; bus slicing; bus budget allocation; burst mode; bus network isolation, reorganization; data copy/broadcast (e.g., same data source cache grouping and routing); word-width and format translation (32 vs. 64); bus wire grouping and partial power down; serial to X-bit bus width conversion; transmission priority with real-time reorganization (e.g., for cache transport); cache virtualization (e.g., enables out-of-core L1/L2 cache collaboration); instruction set mapping and translation; and/or expandable with programmable interpretation thread application.

It should be understood that the present invention can be realized in hardware, software, a propagated signal, or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code, or notation, of a set of instructions intended to cause a system having an information processing capability to perform a particular function either directly or after either or both of the following: (a) conversion to another language, code, or notation; and/or (b) reproduction in a different material form.

Embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computationally-networked unified data bus for a multi-core architecture, comprising:
    a unified data bus;
    a first data bus adapter coupled to the unified data bus;
    a first core, comprising a first customer data bus, coupled to the first data bus adapter, the first data bus adapter configured to encapsulate, translate, and interpret data communicated to the unified data bus from the first core from a first format of the first core into a common format of the unified data bus and to the first core from the unified data bus from the common format to the first format for delegation of processing to a second core, wherein the first data bus adapter is specific to the first core and wherein all data communicated to the first core and all data communicated from the first core pass through the first data bus adapter;
    a second data bus adapter coupled to the unified data bus; and
    the second core, comprising a second customer data bus, coupled to the second data bus adapter, the second data bus adapter configured to encapsulate, translate, and interpret data communicated to the unified data bus from the second core from a second format of the second core into the common format of the unified data bus and to the second core from the unified data bus from the common format to the second format for delegation of processing to the first core, wherein the second data bus adapter is specific to the second core and wherein all data communicated to the second core and all data communicated from the second core pass through the second data bus adapter;

wherein the first core and the second core are hybrid cores.

2. The computationally-networked unified data bus of claim 1, the first core and the second core each comprising at least one element selected from a group consisting of: memory input/outputs (I/Os), cache, heterogeneous data buses, and processors.

3. The computationally-networked unified data bus of claim 1, the first bus adapter and the second data bus adapter comprising nodes.

4. The computationally-networked unified data bus of claim 1, the data comprising an entity that includes memory addressing information and content to enable out-of-immediate memory virtualization, instruction translation, delegated instruction interpretation, faster cache virtualization, and dynamic bus management.

5. The computationally-networked unified data bus of claim 4, the data being packaged with a predefined format.

6. A computationally-networked unified data bus for a multi-processing domain architecture, comprising:
a unified data bus;
a first data bus adapter coupled to the unified data bus;
a first processing domain, comprising a first collaborative processing mode and a first customer data bus, the first customer data bus coupled to the first data bus adapter, the first data bus adapter configured to encapsulate, translate, and interpret data communicated to the unified data bus from the first processing domain from the first collaborative processing mode of the first processing domain into a common format of the unified data bus and to the first processing domain from the unified data bus from the common format to the first collaborative processing mode, wherein the first data bus adapter is specific to the first processing domain and wherein all data communicated to the first processing domain and all data communicated from the first processing domain pass through the first data bus adapter;
the second data bus adapter coupled to the unified data bus; and
a second processing domain, comprising a second collaborative processing mode and a second customer data bus, the second processing domain coupled to the second data bus adapter, the second data bus adapter configured to encapsulate, translate, and interpret data communicated to the unified data bus from the second processing domain from the second collaborative processing mode of the second processing domain into a common format of the unified data bus and to the second processing domain from the unified data bus from the common format to the second collaborative processing mode, wherein the second data bus adapter is specific to the second processing domain and wherein all data communicated to the second processing domain and all data communicated from the second processing domain pass through the second data bus adapter;
wherein the first processing domain and the second processing domain are hybrid processing domains configured to collaborate with one another across the unified data bus via the first collaborative processing mode and the second collaborative processing mode.

7. The computationally-networked unified data bus of claim 6, the first processing domain and the second processing domain each comprising at least one element selected from a group consisting of: memory input/outputs (I/Os), cache, heterogeneous data buses, and processors.

8. The computationally-networked unified data bus of claim 6, the first bus adapter and the second data bus adapter comprising nodes, the nodes connected to one another by a link, the link comprising one or more of the following functions: connection configuration, real-time bus optimization, and routing.

9. The computationally-networked unified data bus of claim 6, the data comprising an entity that includes memory addressing information and content to enable out-of-immediate memory virtualization, instruction translation, delegated instruction interpretation, faster cache virtualization, and dynamic bus management.

10. The computationally-networked unified data bus of claim 9, the data being packaged with a predefined format.

11. A method for producing a computationally-networked unified data bus for a multi-processing domain architecture, comprising:
providing a unified data bus;
coupling a first data bus adapter coupled to the unified data bus;
coupling a first processing domain, comprising a first collaborative processing mode and a first custom data bus, coupled to the first data bus adapter, the first data bus adapter configured to encapsulate, translate, and interpret data communicated to the unified data bus from the first processing domain from the first collaborative processing mode of the first processing domain into a common format of the unified data bus and to the first processing domain from the unified data bus from the common format to the first collaborative processing mode, for delegation of processing to a second processing domain, wherein the first data bus adapter is specific to the first processing domain and wherein all data communicated to the first processing domain and all data communicated from the first processing domain pass through the first data bus adapter;
coupling a second data bus adapter coupled to the unified data bus; and
coupling a second processing domain, comprising a second collaborative processing mode and a second custom data bus, coupled to the second data bus adapter, the second data bus adapter configured to encapsulate, translate, and interpret data communicated to the unified data bus the second processing domain from the second collaborative processing mode of the second processing domain into a common format of the unified data bus and to the second processing domain from the unified data bus from the common format to the second collaborative processing mode, for delegation of processing to the first processing domain, wherein the second data bus adapter is specific to the second processing domain and wherein all data communicated to the second processing domain and all data communicated from the second processing domain pass through the second data bus adapter;
wherein the first processing domain and the second processing domain are hybrid processing domains configured to collaborate with one another across the unified data bus via the first collaborative processing mode and the second collaborative processing mode.

12. The method of claim 11, the first processing domain and the second processing domain each comprising at least one element selected from a group consisting of: memory input/outputs (I/Os), cache, heterogeneous data buses, and processors.

13. The method of claim 11, the first bus adapter and the second data bus adapter comprising nodes, the nodes connected to one another by a link.

14. The method of claim 13, wherein the nodes comprises one or more of the following functions: connection configuration, real-time bus optimization, and routing.

15. The method of claim 11, the data comprising an entity that includes memory addressing information and content to enable out-of-immediate memory virtualization, instruction translation, delegated instruction interpretation, faster cache virtualization, and dynamic bus management.

16. The method of claim 15, the data being packaged with a predefined format.

\* \* \* \* \*